United States Patent
Booij (10) Patent No.: US 11,563,607 B2
(45) Date of Patent: Jan. 24, 2023

(54) ORTHOGONAL FREQUENCY SCHEME FOR NARROWBAND ACOUSTIC SIGNALING

(71) Applicant: Forkbeard Technologies AS, Oslo (NO)

(72) Inventor: Wilfred Edwin Booij, Oslo (NO)

(73) Assignee: Forkbeard Technologies AS, Oslo (NO)

( * ) Notice: Subject to any disclaimer, the term of this patent is extended or adjusted under 35 U.S.C. 154(b) by 499 days.

(21) Appl. No.: 16/580,268

(22) Filed: Sep. 24, 2019

(65) Prior Publication Data

US 2021/0091986 A1      Mar. 25, 2021

(51) Int. Cl.
  *H04L 27/16*      (2006.01)
  *G01S 1/74*       (2006.01)
  (Continued)

(52) U.S. Cl.
  CPC ............... *H04L 27/16* (2013.01); *G01S 1/753* (2019.08); *H04B 11/00* (2013.01); *H04L 1/0033* (2013.01);
  (Continued)

(58) Field of Classification Search
  CPC ....... H04L 27/16; H04L 1/0033; H04L 27/12; G01S 1/753; G01S 2201/025; H04B 11/00; H04W 4/029
  See application file for complete search history.

(56) References Cited

U.S. PATENT DOCUMENTS

| 4,068,198 A | 1/1978 | Otto |
| 4,109,100 A * | 8/1978 | Unkauf ............... H04L 27/2071 375/376 |

(Continued)

FOREIGN PATENT DOCUMENTS

| EP | 0 577 323 A1 | 1/1994 | |
| WO | WO-2021059138 A1 * | 4/2021 | ............. G01S 1/753 |

OTHER PUBLICATIONS

International Search Report dated Dec. 21, 2020 for Appl. No. PCT/IB2020/058856, 3 pages.

(Continued)

*Primary Examiner* — Daniel Pihulic
(74) *Attorney, Agent, or Firm* — Sterne, Kessler, Goldstein & Fox P.L.L.C.

(57) ABSTRACT

A transmitter is disclosed. The transmitter includes a clock configured to generate one or more output clock signals. The transmitter further includes at least one frequency divider configured to generate a plurality of divided frequencies based on the one or more output clock signals, and a modulator. The transmitter also includes at least one antenna or transducer configured to transmit modulated data. The transmitter includes a memory configured to store instructions, and at least one processor configured to execute instructions performing operations including mapping data to a decimal code value of a plurality of decimal code values, converting the decimal code value to a shrinking base system, and selecting a set of frequencies among the plurality of divided frequencies based on the code value corresponding to the shrinking base system for the decimal code value. The modulator may be configured to modulate the decimal code value using the set of frequencies.

20 Claims, 4 Drawing Sheets

(51) Int. Cl.
*H04B 11/00* (2006.01)
*H04L 1/00* (2006.01)
*H04L 27/12* (2006.01)

(52) U.S. Cl.
CPC ........ *H04L 27/12* (2013.01); *G01S 2201/025* (2019.08)

(56) References Cited

U.S. PATENT DOCUMENTS

| | | | |
|---|---|---|---|
| 5,329,258 A * | 7/1994 | Matsuura | H04L 27/106 332/100 |
| 2009/0098834 A1 | 4/2009 | Yoshida et al. | |
| 2021/0091986 A1* | 3/2021 | Booij | H04W 4/029 |

OTHER PUBLICATIONS

Written Opinion dated Dec. 21, 2020 for Appl. No. PCT/IB2020/058856, 10 pages.

* cited by examiner

ORTHOGONAL FREQUENCY SCHEME FOR NARROWBAND ACOUSTIC SIGNALING

FIELD

The present disclosure relates generally to a modulation scheme in a communication system.

BACKGROUND

For location detection inside a building, ultrasonic sound waves may be used to identify location of a mobile unit or a mobile tag. The ultrasonic sound waves used for such location detection are usually above 40 KHz. Human ears can normally hear audio waves which are in frequency range 20 Hz to 20 KHz. Sound waves above 20 KHz frequency range are inaudible by human ears. However, some humans may able to hear audio waves which are slightly above 20 KHz. Instead of a specially designed mobile tag to identify location of a person wearing the mobile tag, location of the person may also be identified based on the mobile unit, such as a mobile phone or a smart phone. A microphone of the mobile phone or the smart phone may receive ultrasonic sound waves, and process information carried by the ultrasonic sound waves to report location of the mobile phone or the smart phone. Because the mobile phone or the smart phone is designed for human conversation, a receiver system of the mobile phone or the smart phone is designed for human audible frequency range. Accordingly, frequency range of the ultrasonic sound waves for location determination using the mobile phone or the smart phone may be required to be in the range of the receiver system of the mobile phone or the smart phone. The transmission of the ultrasonic sound waves should not cause transmitted signal to go below 20 KHz frequency range that may make some humans uncomfortable.

SUMMARY

In an embodiment of the present disclosure, a transmitter is disclosed. The transmitter may include a clock configured to generate one or more output clock signals. The transmitter may also include at least one frequency divider configured to generate a plurality of divided frequencies based on the one or more output clock signals. The transmitter may also include at least one antenna or transducer configured to transmit modulated data. The transmitter may also include a memory configured to store instructions and at least one processor configured to execute instructions performing operations including mapping data to a decimal code value of a plurality of decimal code values. The operations may also include converting the decimal code value to a shrinking base system and selecting a set of frequencies among the plurality of divided frequencies based on the code value corresponding to the shrinking base system for the decimal code value. The transmitter may also include a modulator configured to modulate the decimal code value using the set of frequencies.

In another embodiment of the present disclosure, a method is disclosed. The method steps may be performed by one or more computing devices. The method may include receiving, via a user interface, a clock frequency, a center carrier frequency, a signal bandwidth, and a count of frequencies to be generated. The method may include determining a plurality of divided frequencies based on the clock frequency, the signal bandwidth, and the count of frequencies to be generated. The method may include determining a plurality of integer frequency divider values corresponding to the plurality of divided frequencies, and generating the plurality of divided frequencies. The method may include mapping transmission data to a decimal code value of a plurality of decimal code values, and selecting a set of frequencies among the plurality of divided frequencies corresponding to the decimal code value for modulating the decimal code value to transmit.

BRIEF DESCRIPTION OF THE DRAWINGS

The accompanying drawings, which are incorporated herein and form a part of the specification, illustrate embodiments of the present disclosure and, together with the description, further explain the principles of the disclosure and enable a person skilled in the pertinent arts to make and use the embodiments.

DETAILED DESCRIPTION

The present disclosure will be described with reference to the accompanying drawings.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment does not necessarily include the particular feature, structure, or characteristic. Moreover, such phrases do not necessarily refer to the same exemplary embodiment. Further, when the disclosure describes a particular feature, structure, or characteristic in connection with an exemplary embodiment, those skilled in the relevant arts will know how to affect such feature, structure, or characteristic in connection with other exemplary embodiments, whether or not explicitly described.

The exemplary embodiments described herein provide illustrative examples and are not limiting. Other exemplary embodiments are possible, and modifications may be made to the exemplary embodiments within the spirit and scope of the disclosure. Therefore, the Detailed Description does not limit the disclosure. Rather, only the below claims and their equivalents define the scope of the disclosure.

Hardware (e.g., circuits), firmware, software, or any combination thereof may be used to achieve the embodiments. Embodiments may also be implemented as instructions stored on a machine-readable medium and read and executed by one or more processors. A machine-readable medium includes any mechanism for storing or transmitting information in a form readable by a machine (e.g., a computing device). For example, in some embodiments a machine-readable medium includes read-only memory (ROM); random-access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that the actions result from computing devices, processors, controllers, or other devices executing the firmware, software, routines, and/or instructions.

Any reference to the term "module" shall be understood to include at least one of software, firmware, and hardware (such as one or more circuit, microchip, or device, or any combination thereof), and any combination thereof. In addition, those skilled in relevant arts will understand that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will fully reveal the general nature of the disclosure so that others can, by applying knowledge of those skilled in relevant arts, readily modify and/or customize for various applications such exemplary embodiments, without undue experimentation and without departing from the spirit and scope of the disclosure. Therefore, such modifications fall within the meaning and plurality of equivalents of the exemplary embodiments based upon the teaching and guidance presented herein. Here, the phraseology or terminology serves the purpose of description, not limitation, such that the terminology or phraseology of the present specification should be interpreted by those skilled in relevant arts in light of the teachings herein.

Figure 1:
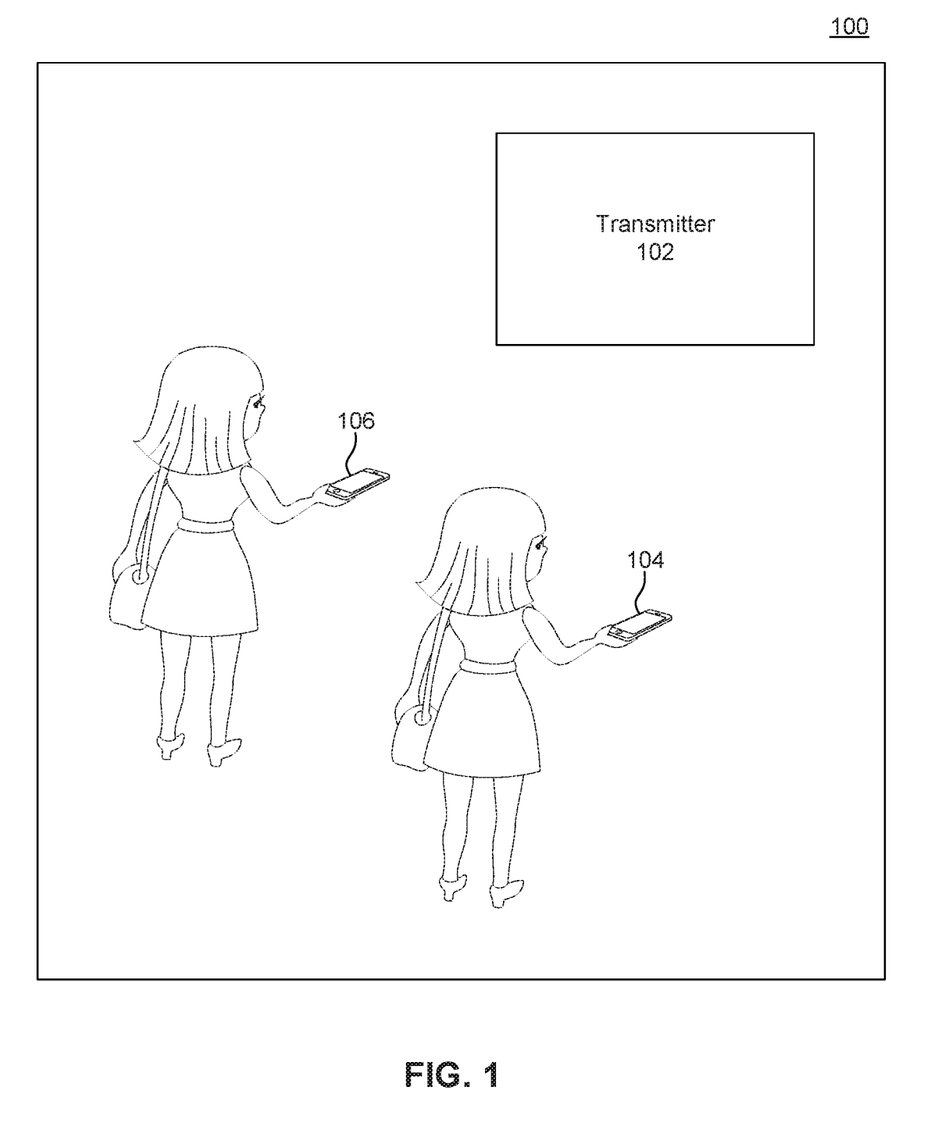
FIG. 1 depicts an environment, in accordance with some embodiments.

FIG. 1 depicts an environment, in accordance with some embodiments. As shown in FIG. 1, a room or a section 100 inside a building is shown. Inside the room 100, a transmitter 102, a person 1 with a mobile phone 1 104, and a person 2 with a mobile phone 2 106 are shown. While detecting a location of a mobile phone 104 or 106 outside of a building is possible based on signals from Global Navigation Signal System (GNSS), signals from the GNSS may not be reachable to the mobile phone 104 or 106 inside the building. Therefore, detection of location of the mobile phone 104 or 106 inside the building may be impossible using GNSS signals. However, location of the mobile phone 104 or 106 may be determined using ultrasonic sound waves. Ultrasonic sound waves may be transmitted via the transmitter 102 located in the room 100. The transmitter 102 may be one of the plurality of ultrasonic transmitters transmitting location identifying information modulated over ultrasonic frequency carrier. When ultrasonic sound waves transmitted by the ultrasonic transmitter 102 carrying location identifying information received by a microphone of the mobile phone 104 or 106, the mobile phone 104 or 106 may process the received ultrasonic sound waves to decode the location information transmitted by the transmitter 102. By way of non-limiting example, the mobile phone 104 or 106 then may transmit an identity of the mobile phone along with the location of the information of transmitter as extracted from the received ultrasonic sound waves via a radio frequency (RF) communication, Wi-Fi, Bluetooth, etc. Accordingly, location of the mobile phone 104 or 106 may be determined to be collocated at the location of the transmitter 102, i.e., in the room 100. By way of non-limiting example, the mobile phone 104 or 106 may have a mobile application downloaded on the mobile phone 104 or 106, which may process location information transmitted by the transmitter 102 to determine location of the mobile phone 104 or 106. Accordingly, the mobile phone 104 and 106 may not be required to send the identity of the mobile phone 104 or 106 to a server (not shown in the FIG. 1) for location determination of the mobile phone 104 or 106.

Various modulation schemes may be used for mobile communication by the transmitter 102 to the mobile phone 104 or 106. As known to a person skilled in the art, various modulation schemes described in this disclosure may be relevant for any communication medium. By way of non-limiting example, such communication medium may be electromagnetic, acoustic, optical, etc. However, digital modulation scheme is preferred over analog modulation scheme because of error-free capability of the digital modulation scheme. Such digital modulation scheme may be BPSK (Binary Phase Shift Keying), QPSK (Quadrature Phase Shift Keying), etc. While QPSK offers benefit of efficient bandwidth, QPSK is not power efficient modulation technique since it requires linear amplifiers to prevent amplifiers from saturation due to sudden phase reversals.

Another modulation scheme such as Frequency Shift Keying (FSK) modulation may be used in which a carrier frequency is shifted according to the information signal. In FSK modulation, M separate oscillators of different frequencies may be required, where M is $2^k$. One of the M frequencies may be selected according to the k-bit symbol that is to be transmitted in a single interval of duration T=k/R seconds. However, because there is sudden switching from one frequency oscillator output to another frequency oscillator output in successive signaling intervals, relatively large spectral side lobes outside the main spectral band of the signal may occur. Consequently, a large frequency band may be required for transmission of the signal. The large spectral side lobes may cause leakage of the signal in the audible frequency range, i.e., below 20 KHz, when ultrasonic sound waves in the frequency range around 20 KHz are used for location detection of the mobile phone 104 or 106 using the mobile phone 104 or 106. Accordingly, both FSK and QPSK modulation schemes have significant disadvantages.

Figure 2:
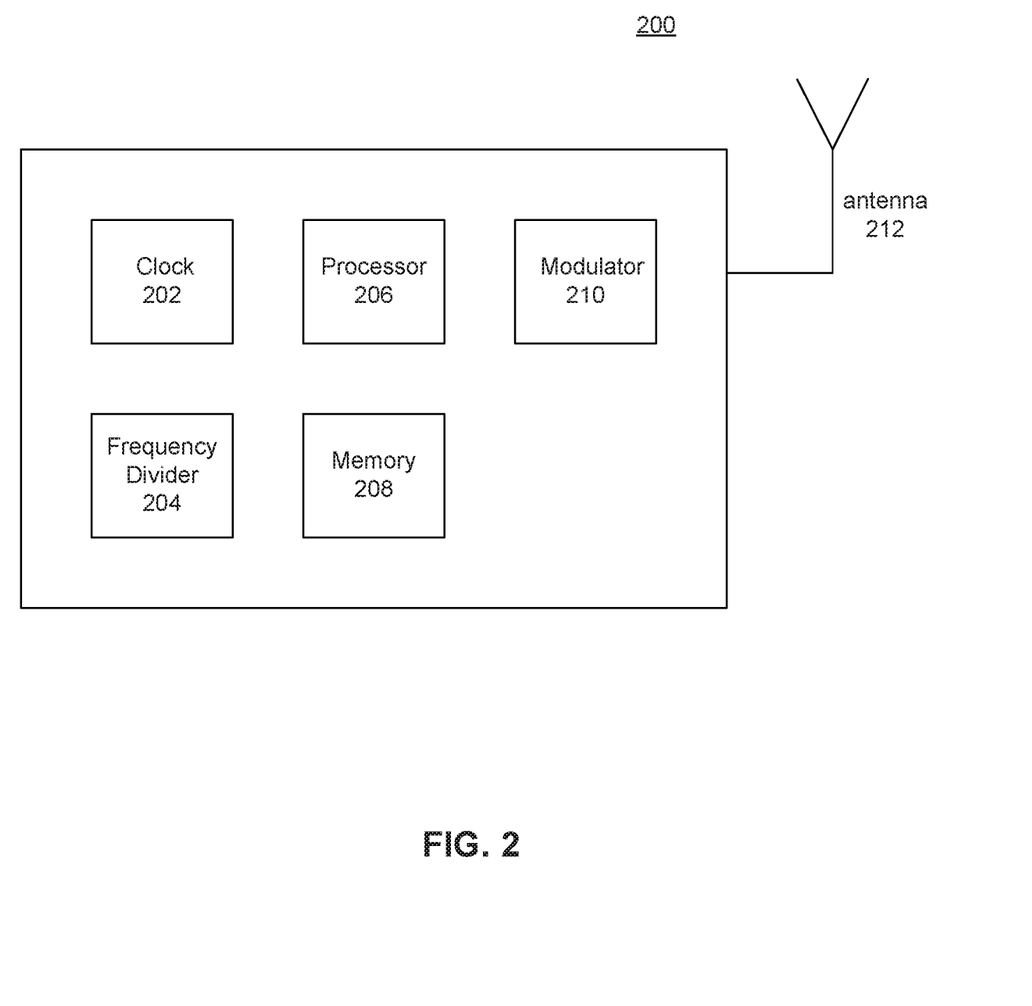
FIG. 2 depicts an exemplary transmitter, in accordance with some embodiments.

FIG. 2 depicts an exemplary transmitter, in accordance with some embodiments. A transmitter 200 may be similar to the one shown in FIG. 1 as the transmitter 102. The transmitter 200 may include a clock 202, a frequency divider 204, a processor 206, a memory 208, a modulator 210, and an antenna 212. The transmitter 200 may include more than one of the clock 202, frequency divider 204, the processor 206, the memory 208, the modulator 210, and the antenna 212. In FIG. 2 the antenna 212 is shown. However, a transducer (not shown in FIG. 2) may also be used in place of or with the antenna 212.

In some embodiments, the clock 202 may be a phase locked loop clock. The phase locked loop clock may be generated using a crystal, or a phase locked loop oscillator. The phased locked loop (PLL) may be analog PLL, digital PLL, or software PLL.

In some embodiments, the modulator 210 may use FSK modulation using n-frequencies (n-FSK modulation scheme), instead of QPSK and FSK. The n-FSK modulation scheme may offer several benefits. These benefits may include lower spectral side lobes or sidebands, orthogonality of codes, and compatibility with deconvolution decoder. However, the above described advantages of the n-FSK modulation scheme may require selecting orthogonal frequencies in a chip period. Further, distribution of the selected orthogonal frequencies in the symbol should be such that low cross-correlation between codes may occur, and frequency spacing should be larger than any Doppler induced frequency shift that may occur.

Because multiple frequencies are used to convey the information, the n-FSK modulation scheme generally warrants large bandwidth. However, only a narrow bandwidth may be available for a voice channel of a mobile communication on the mobile phone 104 or 106. By way of non-limiting example, the available bandwidth may often be of the order of $2 \times f_{chip}$, which is less than 1 KHz. Therefore, only three carrier frequencies may be available, which may be $-f_{chip}$, 0, and $f_{chip}$, where 0 may represent a center carrier frequency and thereby making the n-FSK modulation scheme a 3-FSK modulation scheme.

In some embodiments, selection of orthogonal frequencies during the chip period may be met since all phasors with a whole number of periods within a time period are orthogonal. So, for a chip frequency of $f_{chip}$, all phasors with frequency $n*f_{chip}$ may be useable, where n may be any positive or integer value.

In some embodiments, instead of three frequencies, the modulator 210 may use five frequencies without affecting the bandwidth requirement by using half frequencies, such as, $-f_{chip}/2$ and $f_{chip}/2$ frequencies. The use of five frequencies including half frequencies may result in occurrence of half a phasor period in the chip period; this may result in chip long 180 degree phase shift applied to subsequent chips.

In some embodiments, selecting orthogonal frequencies for a chip period may depend on selecting frequencies for a code. Each code may be represented by a combination of frequencies selected from the five frequencies, which may be $-f_{chip}$, $-f_{chip}/2$, 0, $f_{chip}/2$, and $f_{chip}$, where 0 may represent a center carrier frequency. Further, the center frequency and the other frequencies of the 5-FSK modulation scheme, for example, the $-f_{chip}$, $-f_{chip}/2$, $f_{chip}/2$, and $f_{chip}$ frequencies may depend on a frequency of the clock 202 of the transmitter 200. Further, the five frequencies $-f_{chip}$, $-f_{chip}/2$, $f_{chip}/2$, and $f_{chip}$ may also depend on a target bandwidth of a signal. By way of non-limiting example, for the clock 202 of 16 MHz frequency, the center carrier frequency supported may be 20434.2 Hz. Accordingly, for target signal of bandwidth of 730 Hz, $-f_{chip}$ frequency may be calculated by the processor 206 to be about 20075.3 Hz and $f_{chip}$, frequency may be calculated to be about 20806.2 Hz. Similarly, $-f_{chip}/2$ and $f_{chip}/2$ may be calculated by the processor 206 to be about 20253.2 Hz and 20618.6 Hz respectively. However, generation of the $-f_{chip}$, $-f_{chip}/2$, 0, $f_{chip}/2$, and $f_{chip}$ frequencies may depend on the frequency of the clock 202, and the calculated frequencies for the $-f_{chip}$, $-f_{chip}/2$, 0, $f_{chip}/2$, and $f_{chip}$, may vary from actual frequencies used as the $-f_{chip}$, $-f_{chip}/2$, 0, $f_{chip}/2$, and $f_{chip}$ frequencies.

Since, the clock 202 is a stable clock, the $-f_{chip}$, $-f_{chip}/2$, 0, $f_{chip}/2$, and $f_{chip}$, frequencies may be generated from the clock 202 using the frequency divider 204. As described above, there may be more than one frequency dividers, each generating a divided frequency based on one or more output clocks of the clock 202. The one or more frequency dividers may be analog or digital frequency dividers. The one or more frequency dividers may be configurable frequency dividers. The one or more configurable frequency dividers thus may generate one or more output clocks from an input clock by dividing the input clock by one or more integer numbers. As a result, the calculated frequencies corresponding to the $-f_{chip}$, $-f_{chip}/2$, 0, $f_{chip}/2$, and $f_{chip}$ frequencies may differ from actual frequencies corresponding to the $-f_{chip}$, $-f_{chip}/2$, 0, $f_{chip}/2$, and $f_{chip}$ frequencies.

By way of non-limiting example, the integer frequency divider values corresponding to the $-f_{chip}$, $-f_{chip}/2$, 0, $f_{chip}/2$, and $f_{chip}$ frequencies may be 797, 790, 783, 776, and 769 for the clock 202 of 16 MHz frequency. Similarly, frequency deviation between the calculated and the actual frequency may also be determined as a difference between the calculated and the actual frequency. A set of the $-f_{chip}$, $-f_{chip}/2$, 0, $f_{chip}/2$, and $f_{chip}$ frequencies may be used to transmit ultrasonic sound waves generated using pulse width modulation. By way of non-limiting example, the ultrasonic sound waves transmitted via the antenna 212 and/or the transducer may carry location identifying information. Accordingly, the modulation scheme described herein may be used in any application that may require benefits of the n-FSK modulation scheme using half frequencies as described herein.

In some embodiments, a chip period corresponding to each frequency of the $-f_{chip}$, $-f_{chip}/2$, 0, $f_{chip}/2$, and $f_{chip}$, frequencies may be determined by the processor 206. The chip period corresponding to the each frequency may be about half of the actual bandwidth of the target signal. Accordingly, the chip period corresponding to the each frequency may be selected that may maintain phase continuity. As a result, an actual chip period may depend on the frequencies being used and sent during a chip.

In some embodiments, to ensure orthogonality, each frequency in CP-FSK scheme consisting of m frequencies may be used only once, and one frequency remains unused for each code. Accordingly, high contrast between codes may result when using the deconvolution technique. Deconvolution technique may be used for signal recovery or error correction. Therefore, the proposed modulation scheme of 5-FSK using half frequencies in which only four of the five frequencies are used for each code, known deconvolution techniques at a receiver end, i.e., at the mobile phone 104 or 106, may be employed for error correction.

By way of non-limiting examples, for the 5-FSK modulation scheme using five different frequencies, a total one-hundred-twenty code values may be available for transmitting signaling information. The one-hundred-twenty code values may be calculated as m factorial (m!) where m represents number of frequencies used in n-FSK modulation scheme. Since, five frequencies are used in 5-FSK modulation scheme using half frequencies, five factorial (5!), i.e., one-hundred-twenty, code values may be available. Since one frequency of the five frequencies used in the 5-FSK modulation scheme is not used, each code may have four chips (m-1 chips) in which each chip may correspond to one of the five frequencies. Accordingly, for each code value of the 120 code values, four frequencies of the five frequencies may be assigned, which may result in highest orthogonality among the codes from an array containing all possible indices. A person skilled in the art may recognize that using four of five frequencies as described above may result in highest orthogonality among the codes, three frequencies out of the five frequencies may also be used to achieve orthogonality among the codes. Available code values thus may vary based on the number of frequencies being used to represent a code value.

In some embodiments, a first step of frequency selection for a code may include converting a code value to an m value number system with shrinking number base m as m, m-1, m-2, . . . 1 until the number base equals 1. After the number base reaches value 1, a new base that includes a min base value may be used. However, since only m-1 chips are being sent, the base does not reset and the min base value may not be required.

As described above, there may be m frequencies to assign which may be a numbers array extended to number of chips. In some embodiments, the extended numbers array may be produced and frequency indices 1 . . . m may be populated in an initial (ramp) frequency array. Subsequently, an element of the initial frequency array may be selected according to a value at an index i in the extended numbers array for output and a frequency at the index i may be removed from the frequency array to avoid reuse. Once, all frequencies in the frequency arrays have been used, the frequency array may be reset.

In some embodiments, by way of non-limiting example, for 5-FSK modulation scheme using half frequencies, each code of the one-hundred-twenty codes with values between 0 and 119 may be assigned four frequencies of the five frequencies using following algorithms described with reference to FIG. 2 and FIG. 3. The algorithms may be executed by the processor 206 and instructions corresponding to the algorithms may be stored in the memory 208. The memory 208 may be RAM, ROM, SRAM, DRAM, etc. By way of non-limiting example, in addition to the instructions corresponding to algorithms, location information of the transmitter 102 may also be stored in the memory 208, and may be transmitted via the antenna 112 and/or the transducer modulated using n-FSK modulation scheme using half frequencies by the modulator 210.

Figure 3:
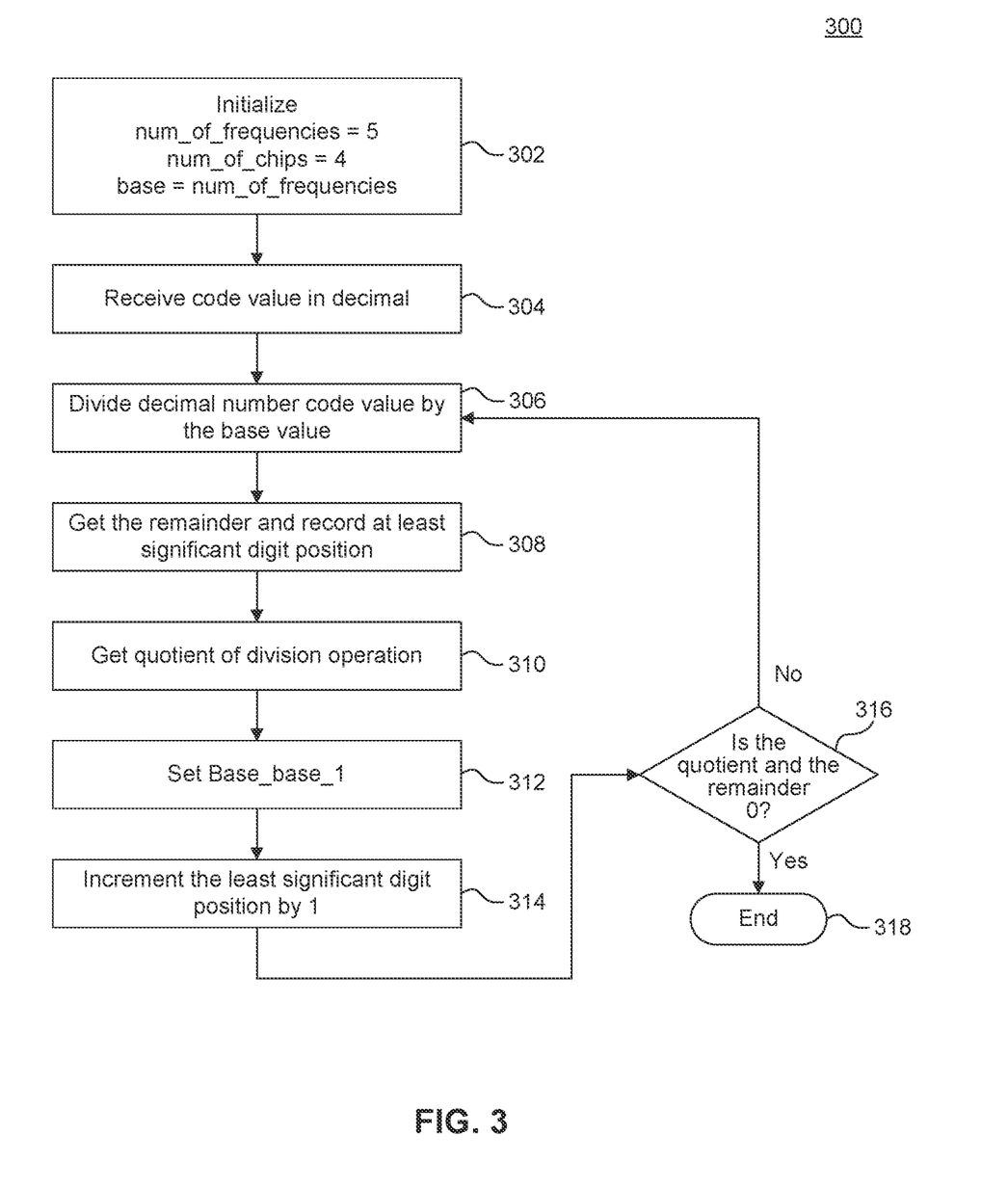
FIG. 3 depicts an exemplary pseudo code, in accordance with some embodiments.

FIG. 3 depicts an exemplary pseudo code, in accordance with some embodiments. In particular, FIG. 3 depicts pseudo code to convert a code value in decimal to the shrinking number base described above.

Algorithm to Convert from Decimal Number to Shrinking Number Base

The algorithm 300 starts at step 302. At step 302, initialization of various variables may be performed. Typically num_of_chips may be set to n-1, where n may represent number of frequencies in a continuum. Setting num_of_chips to n-1 guarantees that one frequency form the continuum of n frequencies remains unused. For the 5-FSK modulation scheme using half frequencies, n is set to 5, which would set num_of_chips to value 4. Base value may be initialized to value of num_of_frequencies, which may be set to 5 for the given example.

At step 304, a code value in decimal may be received for conversion to shrinking number base.

At step 306, the received code in decimal may be divided by the base value, and remainder of the division operation may be received at step 308. At step 308, the remainder may be recorded as a least significant bit of the code of the shrinking number base.

At step 310, quotient of the division operation may be calculated. At step 312, the base value may be decremented by 1. At step 314, a position of the least significant position may be incremented by 1, i.e., left shifted by 1 position. At step 316, value of the quotient and remainder may be checked for 0. If the quotient and the remainder both are of value 0, then the conversion of the code value from decimal to the shrinking base is complete. Otherwise, steps described above with reference to 306 through 316 may be repeated.

For 5-FSK modulation scheme using half frequencies, decimal numbers exceeding num_of_frequencies!-1, i.e., 119, the above process can be restarted once the base number reaches 1.

By way of non-limiting example, the following table may represent shrinking number base determined as per above algorithm for a partial set of code values with values 0 to 5. A person skilled in the art may generate instructions to be executed by the processor 206 to convert each decimal code value of up to 119 and above based on the algorithm described above.

TABLE 1

Code value to shrinking base conversion and frequency indices

| Code Value | Shrinking Base Conversion | | | | Frequency Indices | | | |
| --- | --- | --- | --- | --- | --- | --- | --- | --- |
| 0 | 0 | 0 | 0 | 0 | 0 | 1 | 2 | 3 |
| 1 | 1 | 0 | 0 | 0 | 1 | 0 | 2 | 3 |
| 2 | 2 | 0 | 0 | 0 | 2 | 0 | 1 | 3 |
| 3 | 3 | 0 | 0 | 0 | 3 | 0 | 1 | 2 |
| 4 | 4 | 0 | 0 | 0 | 4 | 0 | 1 | 2 |
| 5 | 0 | 0 | 0 | 0 | 0 | 2 | 1 | 3 |

Figure 4:
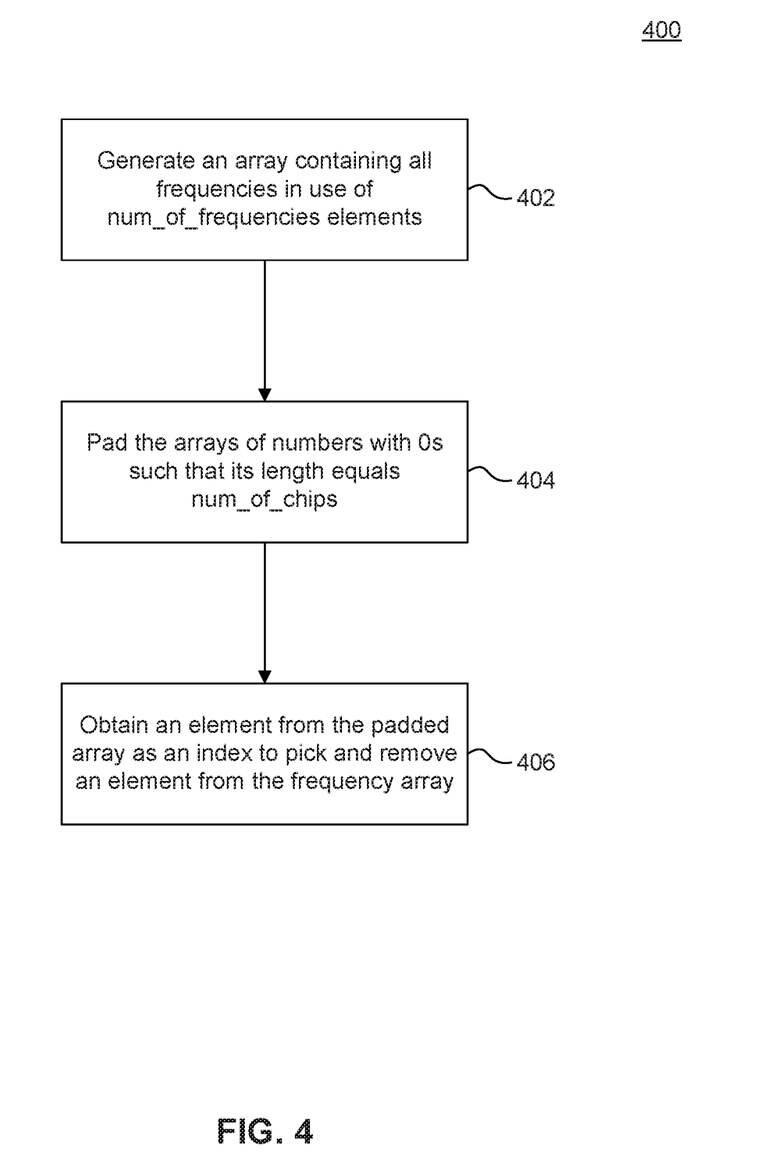
FIG. 4 depicts an exemplary pseudo code, in accordance with some embodiments.

FIG. 4 depicts an exemplary pseudo code, in accordance with some embodiments. In particular, FIG. 4 depicts pseudo code to select frequencies corresponding to the code value converted to the shrinking number base as described with reference to FIG. 3 above.

Algorithm to Select Frequencies Corresponding to the Code Value

The algorithm 400 starts at step 402. At step 402, an array containing all frequencies to be used in the n-FSK modulation scheme using half frequencies may be populated. By way of non-limiting example, the array may be populated with values of the integer frequency dividers corresponding to the frequencies of the n-FSK modulation scheme using half frequencies. The array may be populated with frequency values corresponding to each frequency of the n-FSK modulation scheme using half frequencies.

At step 404, another array that may represent frequencies corresponding to the code value may be initialized with 0.

At step 406, an element from the other array may be selected as an index of the array containing all frequencies to be used in the n-FSK modulation scheme using half frequencies. By way of non-limiting example, referring back to Table 1, for the code value 2 in decimal, the shrinking base value corresponds to 2, 0, 0, and 0. Accordingly, a first frequency may be selected that may correspond to a frequency at an index 2 in the array containing all frequencies populated at step 402. Since, number of frequencies selected should equal to number of chips, i.e., 4 in the given example, three more frequencies need to be selected. Accordingly, step 406 may be repeated for three more times in the given example. Subsequently, frequency at index 0 may be selected when the step 406 is repeated for the first time. Since, each frequency is being used only one, when the step 406 is repeated again, the frequency at 0 index may not be used. Therefore, next available frequency at index 1 may be used. And, when the step 406 is repeated for the final time, frequency at index 0, 1, and 2 are unavailable. Accordingly, frequency at index 3 may be selected.

As shown in table 1 above, frequency indices for the decimal code value 0 corresponds to 2, 0, 1, and 3 as described above. The frequencies at index 0, 1, 2, 3, and 4 may correspond to the $-f_{chip}$, $-f_{chip}/2$, 0, $f_{chip}/2$, and $f_{chip}$ frequencies respectively. Accordingly, code value 2 in decimal may be transmitted using frequencies that may correspond to the center frequency, $-f_{chip}$ frequency, $-f_{chip}/2$ frequency, and $f_{chip}/2$ frequency. A person skilled in the art may generate instructions to be executed by the processor 206 to determine frequency indices corresponding to each code value in decimal.

In some embodiments, orthogonality of the codes may be required for deconvolution process. The orthogonality of the codes may be accomplished by not reusing the frequencies within a short time interval. By making sure that the bandwidth of the used frequency and the chip frequency have an integer ratio when calculated as bandwidth/$f_{chip}$=n, where n=2 . . . 6, a good orthogonality may be guaranteed. The frequency scheme may include k frequencies, with equal frequency spacing $f_{space}$, where k may be calculated as $f_{chip}/f_{space}$ with k having a value between 2 and 6.

For the above example of using 5-FSK, there are 120 different symbols or code values, when the symbol contains 5 chips. By limiting the number of chips to 4, a magnitude dip in the frequency spectrum may be caused during a deconvolution operation. The magnitude dip in the frequency spectrum may result in a low signal to noise ratio (SNR) for the decoder during deconvolution process. Accordingly, some codes having a low SNR may be rejected during the deconvolution process. The codes which may be rejected during deconvolution process may be referenced as bad codes. By way of non-limiting example, the following codes may be bad codes for the 5-FSK modulation scheme using half frequencies for the clock frequency of 16 MHz and the target signal bandwidth of 730 Hz.

Bad code values: 0, 19, 33, 34, 38, 39, 59, 60, 80, 81, 85, 86, 100, and 119.

In some embodiments, an optimal signal to noise ratio may be obtained when IQ sampling rate is just in excess of the critical sampling rate. By way of non-limiting example, for complex signals, the critical sampling rate equals the bandwidth of the signal. So, for a signal with bandwidth of twice the $f_{chip}$, the sampling frequency may be 2.2 to 2.5 times $f_{chip}$. This may result in 10 to 25% higher bandwidth to create space for an anti-alias filter. By way of non-limiting example, IQ signals may be sampled at an rate of 2.44 times $f_{chip}$ for the above described 5-FSK modulation scheme using half frequencies and bandpass filtered, which may result in a signal to noise ratio (SNR) determined as a result of deconvolution process to be of approximately 3.9 compared to 200 when using a matching template.

A template may be an ideal signal for the code as transmitted in an IQ sampling format. By way of non-limiting example, the deconvolution process may include division of the received signal by the template in a frequency space corresponding to code followed by an inverse Fourier transform (IFT). The SNR of the resulting deconvolution signal may depend on whether the received signal comprises multiple phase shifted copies of the template signal. Accordingly, if the template and the received signal have a matching code value, the SNR of the resulting deconvolution may be between 3.9 to 200 corresponding to a path between the transmitter 102 and the receiver, i.e., the mobile phone 104 or 106. Accordingly, the SNR of below 3.9 may indicate the template code value is different from the transmitted code value. By way of non-limiting example, the code value which may result in a SNR of below 3.9 after deconvolution process may be considered bad code value and may be avoided.

In some embodiments, a code value that may perform poorly in the deconvolution process may be determined based on assessment criteria. By way of non-limiting example, the assessment criteria may include verifying nodes in a frequency spectrum of the corresponding code value. The assessment criteria may include performing auto-correlation of the frequency spectrum and finding width of the resulting auto-correlation function. Accordingly, codes having excessive auto-correlation width may be identified as bad code values. The bad code values should not be used in transmission to carry signaling information. By way of non-limiting example, auto-correlation width of more than 0.3 may be considered excessive.

In some embodiments, for orthogonality of the code values for the above described 5-FSK modulation scheme using half frequencies, the frequency spacing may be set to half of the $f_{chip}$ frequency. A phase change corresponding to the $-f_{chip}$, $-f_{chip}/2$, 0, $f_{chip}/2$, and $f_{chip}$ frequencies may be 0, 180, 0, 180, and 0 degree respectively. Accordingly, a total frequency spacing may be $2xf_{chip}$.

While the above disclosed exemplary scheme may use a clock of 16 MHz with number of number chips 4 with 5 different frequencies, there may be many different combinations of frequencies for the code may be generated for different bandwidth. Accordingly, suggested bandwidth may include 500 Hz, 700 Hz, 800 Hz, 730 Hz, 625 Hz, and 40 KHz. Further, each scheme may use different center frequency and different sampling rate. However, bandwidth of 625 Hz with center frequency of 20408 Hz and base clock of 8 MHz may offer the benefit of low bandwidth and addresses issues related to audibility and performance on narrowband signaling better in comparison with other bandwidth schemes described above.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A transmitter comprising:
    a clock configured to generate one or more output clock signals;
    at least one frequency divider configured to generate a plurality of divided frequencies based on the one or more output clock signals;
    a modulator;
    at least one antenna or transducer configured to transmit modulated data;
    a memory configured to store instructions; and
    at least one processor configured to execute instructions performing operations comprising:
        mapping data to a decimal code value of a plurality of decimal code values;
            converting the decimal code value to a shrinking base system; and
            selecting a set of frequencies among the plurality of divided frequencies based on the code value corresponding to the shrinking base system for the decimal code value;

wherein the modulator is configured to modulate the decimal code value using the set of frequencies.

2. The transmitter of claim 1, wherein the modulator is further configured to modulate using frequency shift key (FSK) modulation scheme.

3. The transmitter of claim 1, wherein the set of frequencies is a subset of the plurality of divided frequencies.

4. The transmitter of claim 1, wherein the set of frequencies are in an ultrasonic frequency range.

5. The transmitter of claim 1, wherein each frequency in the set of frequencies is different from other frequencies in the set of frequencies.

6. The transmitter of claim 1, wherein frequencies in the set of frequencies are orthogonal frequencies.

7. The transmitter of claim 1, wherein a total frequency spacing of the plurality of divided frequencies is not more than twice a chip frequency.

8. The transmitter of claim 1, wherein the operations further comprise:
   determining a plurality of integer frequency divider values to generate the plurality of divided frequencies corresponding to a signal bandwidth and a center carrier frequency.

9. The transmitter of claim 1, wherein the operations further comprise:
   determining a chip period corresponding to each frequency of the plurality of divided frequencies,
   wherein the determined chip period corresponding to each frequency of the plurality of divided frequencies maintains phase continuity.

10. The transmitter of claim 1, wherein the signaling information comprise location information of the transmitter.

11. A method comprising:
    receiving, via a user interface, a clock frequency, a center carrier frequency, a signal bandwidth, and a count of frequencies to be generated;
    determining a plurality of divided frequencies based on the clock frequency, the signal bandwidth, and the count of frequencies to be generated;
    determining a plurality of integer frequency divider values corresponding to the plurality of divided frequencies;
    generating, by one or more frequency dividers, the plurality of divided frequencies;
    mapping transmission data to a decimal code value of a plurality of decimal code values; and
    selecting a set of frequencies among the plurality of divided frequencies corresponding to the decimal code value for modulating the decimal code value to transmit, wherein the set of frequencies is a subset of the plurality of divided frequencies.

12. The method of claim 11, wherein modulating the decimal code value further comprises modulating using frequency shift keying (FSK) modulation scheme.

13. The method of claim 11, wherein the selecting the set of frequencies comprises selecting frequencies in an ultrasonic frequency range.

14. The method of claim 11, wherein frequencies in the set of frequencies are orthogonal frequencies.

15. The method of claim 11, wherein the selecting the set of frequencies further comprises:
    converting the decimal code value to a shrinking base system; and
    selecting a frequency corresponding to each value of the decimal code value based on the shrinking base system from the plurality of divided frequencies,
    wherein the frequency corresponding to each value of the decimal code value based on the shrinking base system is different from each other.

16. The method of claim 11, wherein the determining the plurality of divided frequencies further comprises maintaining a total frequency spacing of the plurality of divided frequencies of not more than twice a chip frequency.

17. The method of claim 11, further comprising determining a chip period corresponding to each frequency of the plurality of divided frequencies to maintain phase continuity.

18. The method of claim 11, further comprising determining orthogonality of the decimal code value in deconvolution process to identify a bad decimal code value.

19. The method of claim 18, wherein identifying the bad decimal code value, the method further comprises performing auto-correlation of a frequency spectrum corresponding to the bad decimal code value to measure an auto-correlation function width.

20. The method of claim 11, wherein modulating the decimal code value further comprises modulating using a 5-FSK modulation scheme.

* * * * *